Dec. 10, 1957  F. G. HALLDEN ET AL  2,816,001
FACSIMILE RECORDERS
Original Filed Feb. 7, 1948  10 Sheets-Sheet 1

INVENTORS
F. G. HALLDEN
D. M. ZABRISKIE
BY
*A. A. Thomas* ATTORNEY

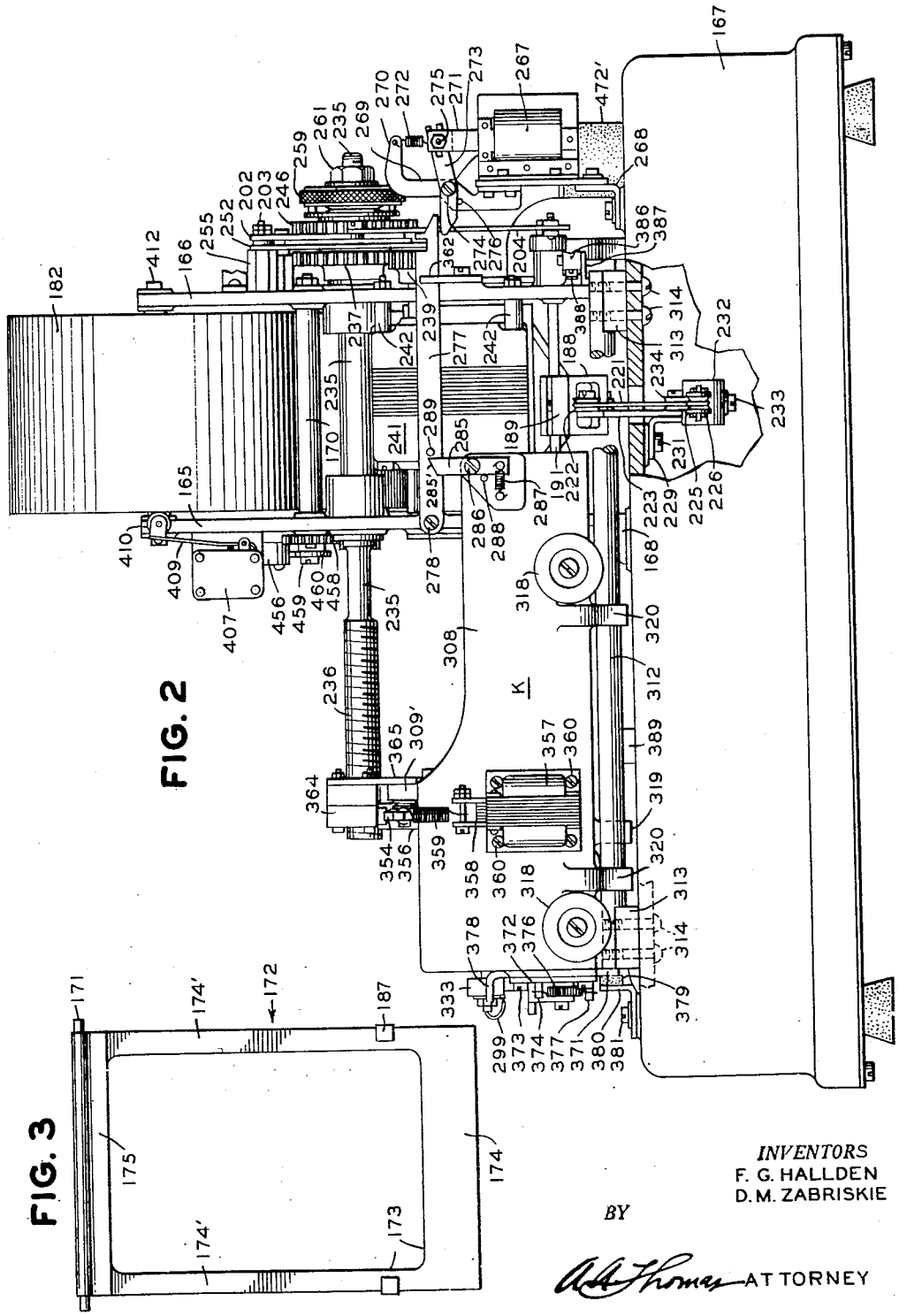

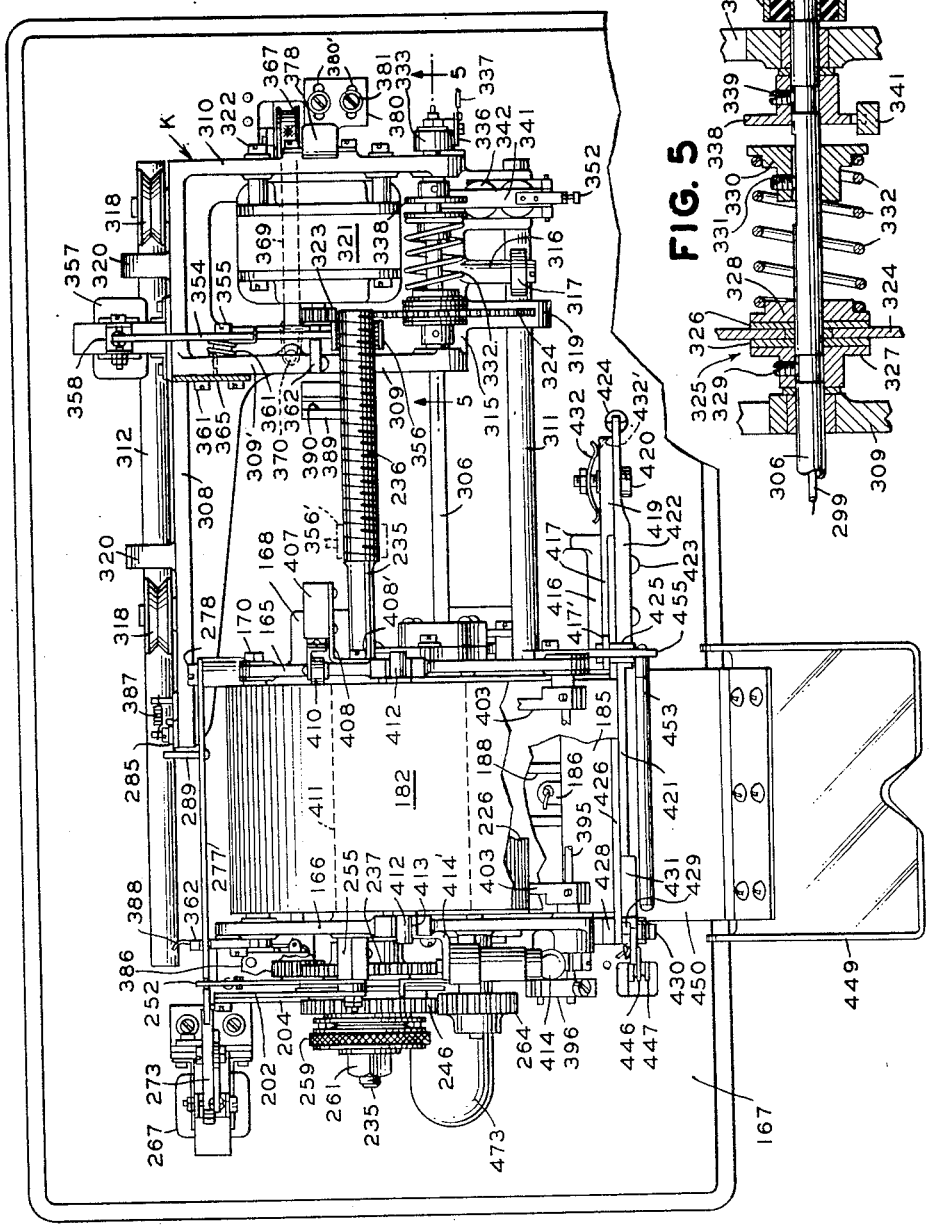

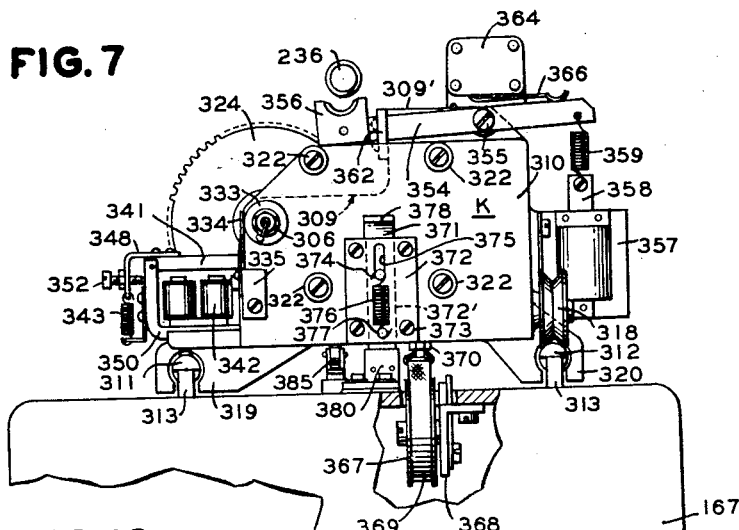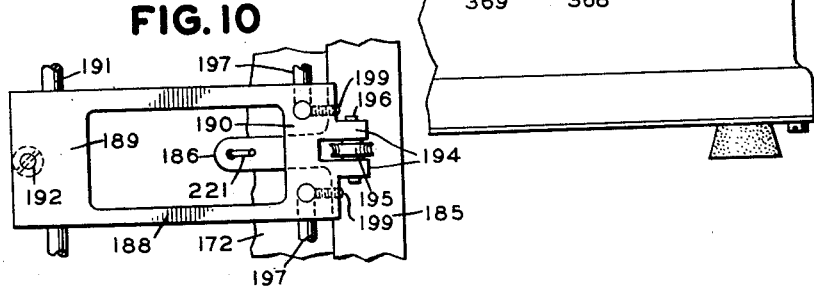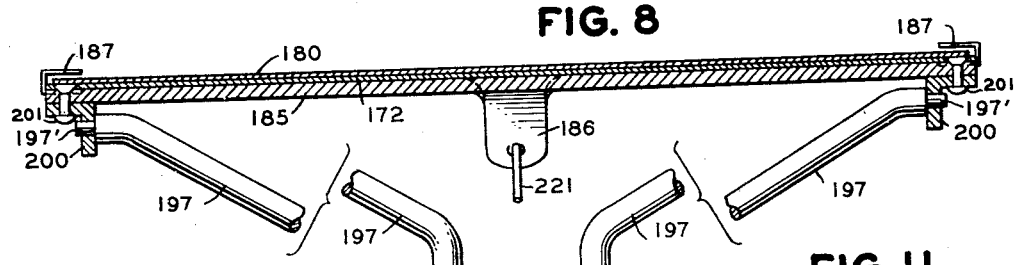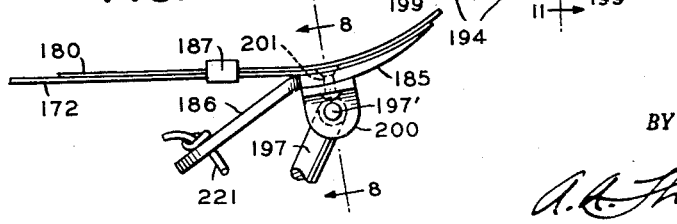

Dec. 10, 1957   F. G. HALLDEN ET AL   2,816,001
FACSIMILE RECORDERS
Original Filed Feb. 7, 1948   10 Sheets-Sheet 8
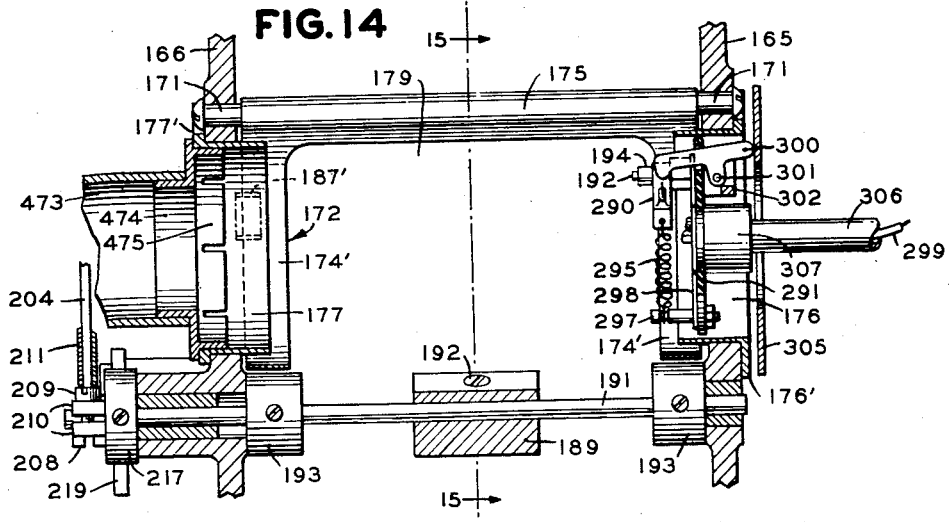
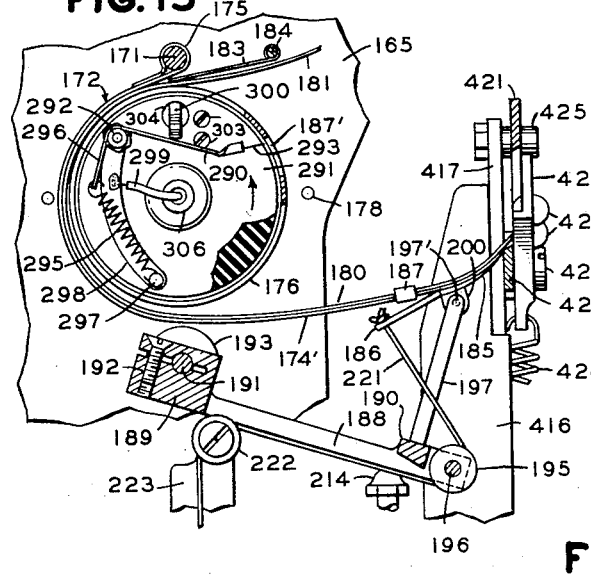
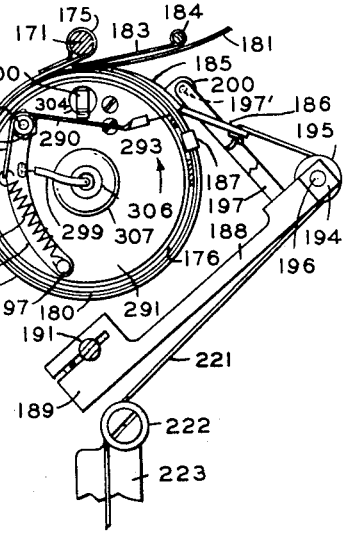
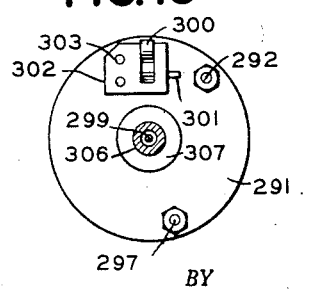
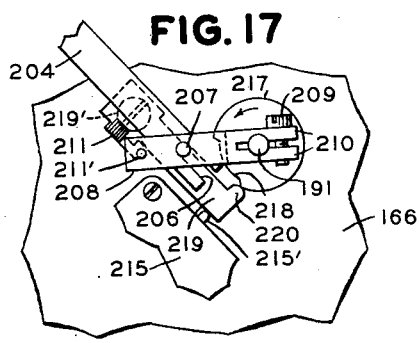
INVENTORS
F. G. HALLDEN
D. M. ZABRISKIE
BY
*A. A. Thomas* —ATTORNEY

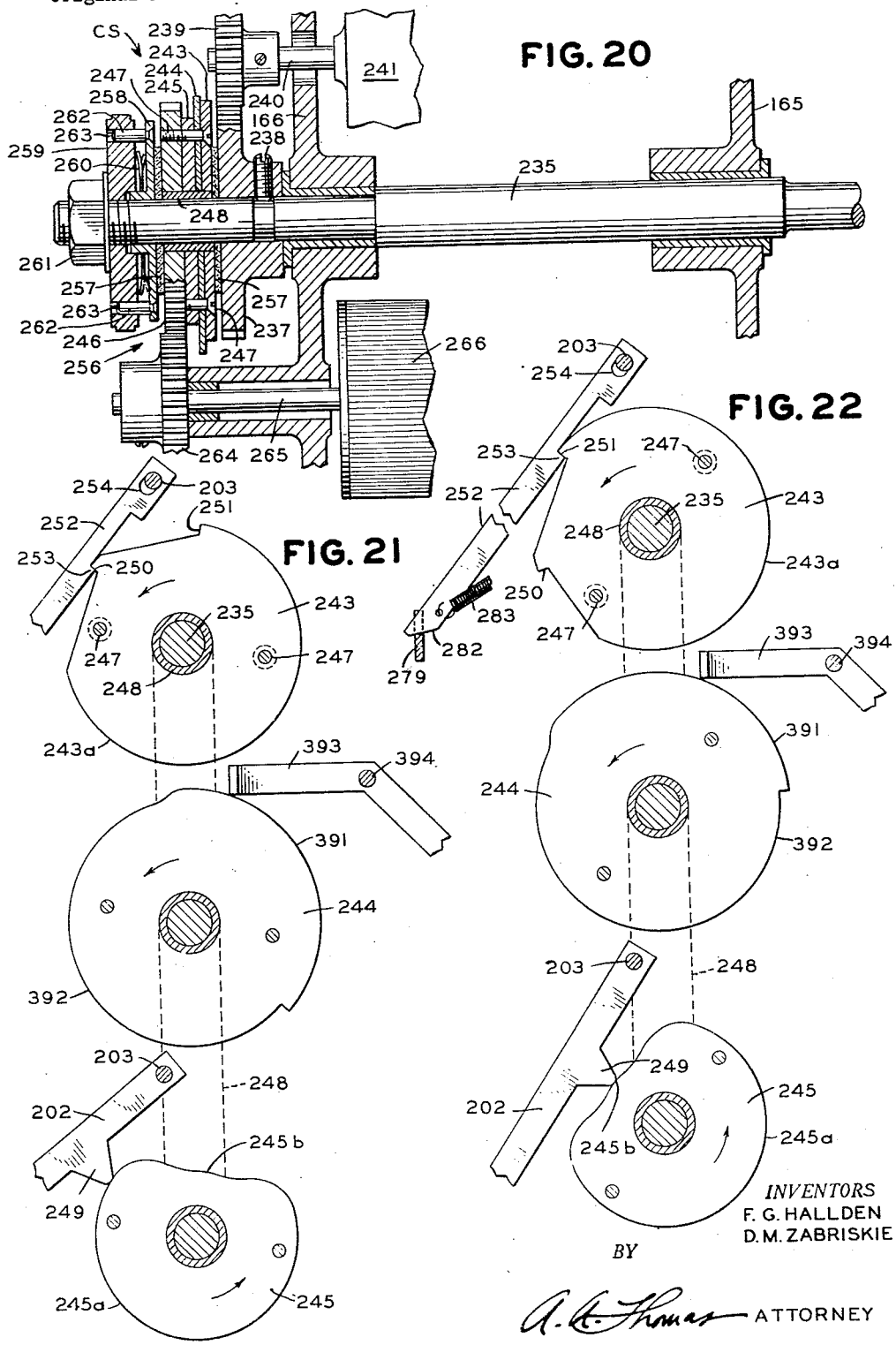

Dec. 10, 1957  F. G. HALLDEN ET AL  2,816,001
FACSIMILE RECORDERS

Original Filed Feb. 7, 1948  10 Sheets-Sheet 10

INVENTORS
F. G. HALLDEN
D. M. ZABRISKIE
BY
A. A. Thomas ATTORNEY

United States Patent Office 2,816,001
Patented Dec. 10, 1957

2,816,001

FACSIMILE RECORDERS

Frederick G. Hallden, Bellrose, N. Y., and Douglas M. Zabriskie, Northvale, N. J., assignors to The Western Union Telegraph Company, New York, N. Y., a corporation of New York Original application February 7, 1948, Serial No. 6,846. Divided and this application November 13, 1951, Serial No. 256,106

3 Claims. (Cl. 346—24)

The subject matter of this application, which is a division of the pending application of Hallden and others, Serial No. 6,846, filed February 7, 1948, now Patent No. 2,672,503 is a facsimile recorder of the internal recording type which is completely automatic in recording messages on a continuous sheet and cutting off each recorded message.

In this machine the recording paper is wrapped into a cylindrical form by means of a flexible wrapper, and a stylus mounted on a slidable carriage rotates inside the cylinder to record the received messages. At the end of a recording operation, during which the stylus travels the length of the paper cylinder, the stylus carriage automatically returns and the wrapper is opened. The recorded message is now fed out of the open wrapper over a knife edge where it is cut off and dropped into a receptacle.

A commercial embodiment of our automatic recorder is shown in the accompanying drawings in which:

Fig. 1 represents a front view of the recorder with a section through the base;

Fig. 1A shows a detail on section line 1A—1A of Fig. 1;

Fig. 1B is an enlarged view on line 1B—1B of Fig. 1 showing the magnetic phasing device for the stylus shaft;

Fig. 2 shows a rear view of the recorder;

Fig. 3 is a flat view of the flexible wrapper used in the recorder for holding a blank in recording position;

Fig. 4 is a top view of the recorder;

Fig. 5 is an enlarged view of the stylus shaft mounting sectioned on line 5—5 of Fig. 4;

Fig. 7 is a right-hand view of the recorder;

Fig. 8 is an enlarged front view of the wrapper and certain parts of the operating mechanism connected thereto, the upper portion of this figure being a section on line 8—8 of Fig. 9;

Fig. 9 shows the movable forward end of the flexible wrapper on an enlarged scale;

Fig. 10 shows a bottom view of the wrapper operating lever;

Fig. 11 is a detail sectioned on line 11—11 of Fig. 8;

Fig. 14 is a sectional view lengthwise through the recording mechanism;

Fig. 15 shows a cross section on line 15—15 of Fig. 14;

Fig. 16 is a view similar to Fig. 15 showing the blank folding wrapper in closed position for recording;

Fig. 17 shows a detail of the connections that operate the wrapper;

Fig. 18 shows the rear side of the stylus carrying disk;

Fig. 19 is an enlarged view of the stylus mounting;

Fig. 20 is an enlarged sectional view on the angular line 20—20 of Fig. 6, showing the driving connections that operate the stylus shaft and the paper feed roller of the recorder;

Figs. 21 and 22 illustrate different positions of the cam assembly that controls certain automatic operations of the recorder;

Figure 6:
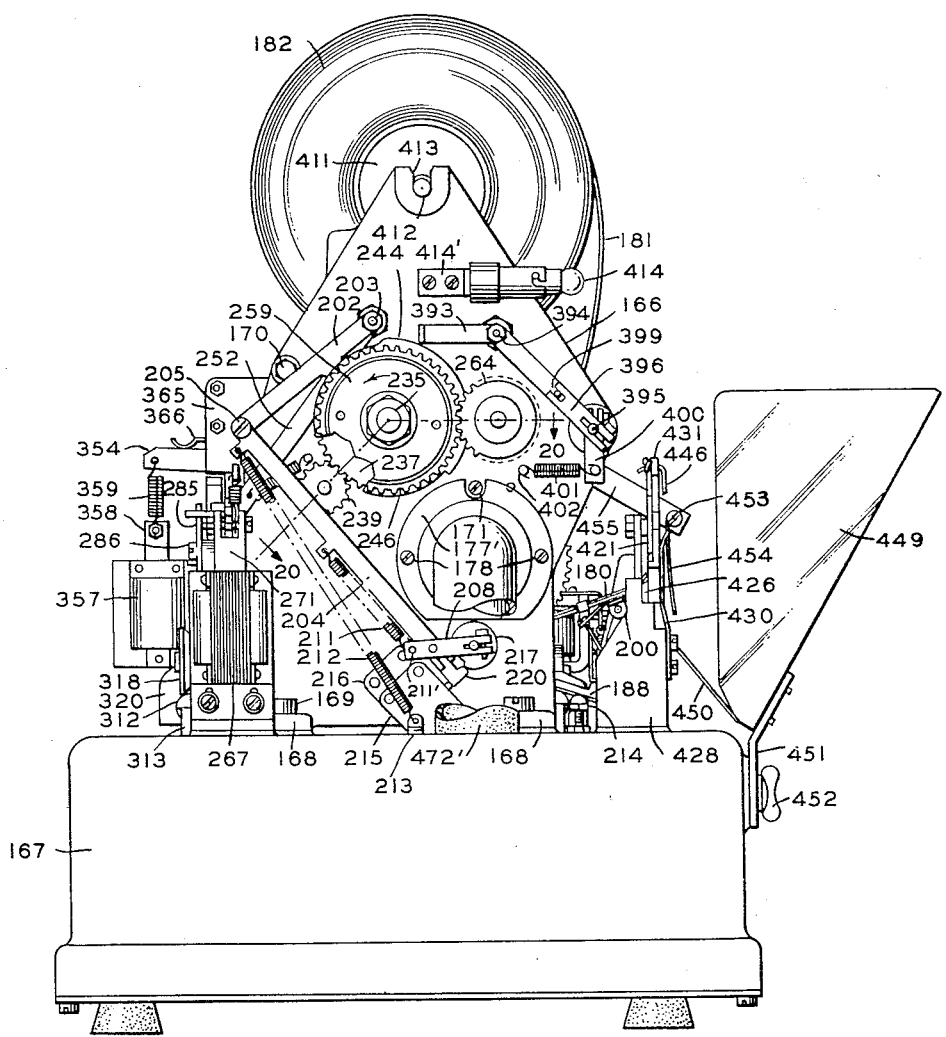
Fig. 6 shows the recorder as viewed from the left end.

Since a detailed description of this machine will necessarily be of considerable length, this specification will be easier to follow and to understand if we divide our description of the recorder into an orderly series of headings for the various devices and mechanisms that make up this machine.

The wrapper mechanism

Looking at Fig. 1 which shows a front view of the recorder, there are two upright frames 165 and 166 rising from the base 167, which is a hollow casting with a chamber 167' to house various parts of the machine. The frames 165 and 166 are not of like construction so we shall distinguish them as the right frame 165 and the left frame 166. Each frame has a pair of lateral flanges 168 at the bottom (Figs. 6 and 12) for receiving bolts or screws 169 which fasten into the base. We usually bolt a brace rod 170 (Fig. 2) to the frames to increase their rigidity as a unitary support.

Referring to Fig. 14, a rod 171 is fastened in the frames 165—166 and this rod has mounted thereon a thin flexible sheet 172 which constitutes the wrapper element of the wrapper mechanism. Fig. 3 shows the form of this sheet as laid out flat. At the present time, we prefer to make the wrapper 172 of Phosphor-bronze so thin as to be easily flexible and we have found it desirable to increase the flexibility by removing a central section of the sheet, as indicated at 173. The metal wrapper 172 is thus in the form of a rectangular frame with a front strip 174 connecting the sides 174' and a rear edge 175 folded around the supporting rod 171. The folded edge of the sheet may be welded or soldered together.

Figure 12:
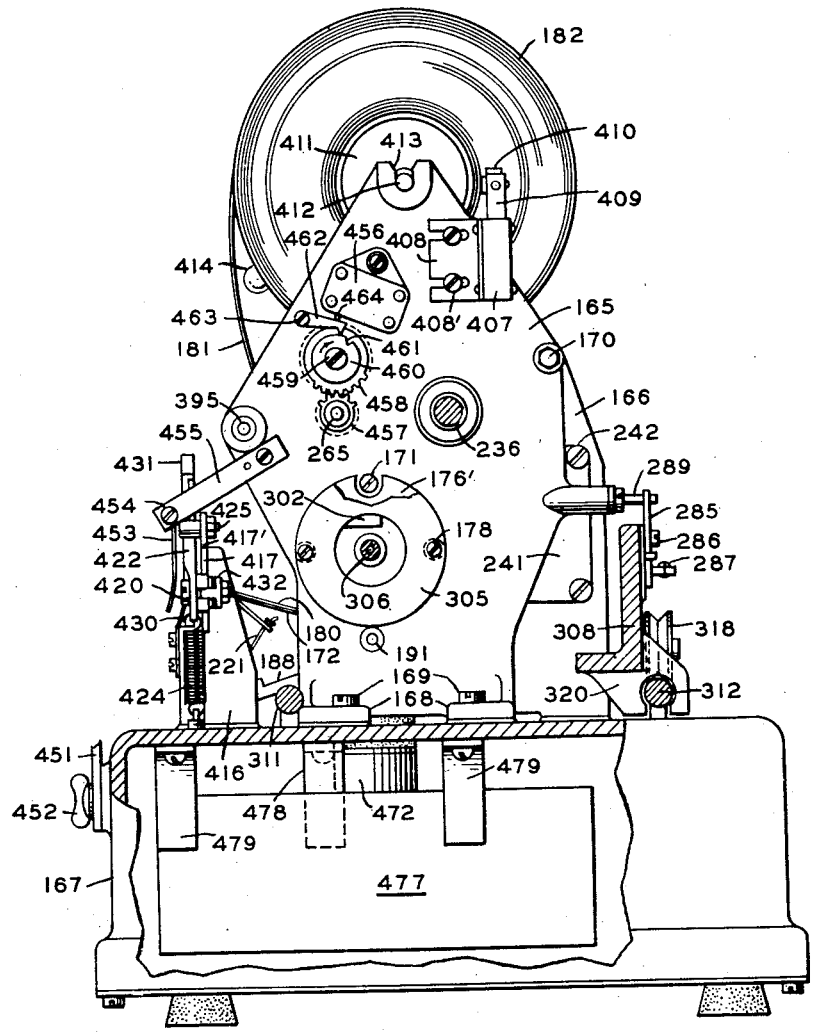
Fig. 12 represents a transverse section on line 12—12 of Fig. 1 looking from right to left.

As shown in Fig. 14, the frames 165 and 166 have aligned openings into which are fitted two cylindrical flanges 176 and 177, respectively. These flanges are formed with integral annular heads 176' and 177', respectively, which are fastened to the frames by screws 178 (Figs. 6 and 12). The cylindrical flanges 176 and 177 extend toward each other into the space 179 which may properly be called the recording chamber for it is here that the recording takes place. It should be observed that the sides 174' of the wrapper 172 overlie the flanges 176 and 177.

The function of the wrapper 172 is to receive a recording blank 180 and wrap it around the flanges 176 and 177 which shape the blank into a cylindral form and support it in that position as long as the wrapper remains closed. The blank 180 is a measured length of paper from the end of a continuous strip 181 fed from a supply roll 182 (Fig. 13) which is mounted on top of the frames 165 and 166. How this definite length of paper is fed into the open wrapper 172 will be explained in our description of the paper feed mechanism under a separate heading. At the moment we need only say that the paper strip 181 is guided by a hinged flap 183 (Fig. 15) through the narrow space between the hinged end of wrapper 172 and the pair of cylindrical flanges 176—177. The guide flap 183 is mounted on a rod 184 supported by the frames 165—166.

Upon entering the wrapper, the paper automatically coils around the shaping flanges 176—177 and then moves forward over the inner surface of the open wrapper until the required length of paper has been fed into the wrapper, as illustrated in Fig. 15. The flexible wrapper 172 is now ready to close and wrap the enclosed recording blank completely over the flanges 176—177 to shape the blank into a perfect cylindrical form, as shown in Fig. 16. The mechanism for operating the wrapper 172 from open to closed position will be described under the next heading.

*The wrapper operating mechanism*

In the description of the wrapper operating mechanism we shall refer particularly to Figs. 6, 8, 9, 10, 13, 15 and 16.

The wrapper 172 is provided at its free or front end with a tip 185 which is a rectangular piece of sheet metal tapering off toward the front edge and having a rear extension 186. The wedge-shaped tip 185 extends entirely across the flexible wrapper 172 and is secured thereto preferably by soldering over its entire surface so that the tip is in effect an integral part of the wrapper. The front edge of the tip 185 terminates at the front edge of the wrapper and the rear extension 186 is bent away from the wrapper for a purpose that will presently be explained.

As best shown in Fig. 9, the soldered surface of tip 185 is curved and thereby holds the end portion of the wrapper 172 at the same curvature, which corresponds precisely to the curvature of the cylindrical flanges 176 and 177. Therefore, when the flexible wrapper is closed (Fig. 16) the curved tip of the wrapper holds the end of the paper blank 180 in firm contact with the shaping flanges 176—177, whereby the blank is made into a perfect cylinder. The thinned edge of the tip 185 makes is sufficiently flexible to hold the paper against the flanges 176—177 with a spring pressure contact, thereby assuring a perfect cylindrical shape for the end portion of the paper blank.

To make certain that the forward end of the blank will follow the curvature of the open wrapper during the paper feed operation, we provide the wrapper 172 with a pair of guide lugs 187 which are U-shaped pieces soldered to the underside of the wrapper a short distance away from the curved tip 185. These lugs are slightly spaced from the top surface of the wrapper to receive the side edges of the blank. The cylindrical flanges 176 and 177 have each an opening 187' (Fig. 14) to accommodate the guide lugs 187 so that the paper lies in contact with the flanges all around it. This will be understood from Fig. 16.

The wrapper sheet 172 is so thin that it would be impossible to attach an actuating connection directly to it, so we utilize the rigid tip 185 as a reinforcing piece to which our novel wrapper operating mechanism is connected. Referring especially to Figs. 8, 10 and 15, a lever 188 in the form of a rectangular casting has a rear mounting block 189 and a front cross bar 190. The block 189 is split and has a hole to receive a rock shaft 191 journaled in the upright frames 165 and 166 (Fig. 14). A set screw 192 clamps the lever 188 to the shaft 191 so that these two parts move together. Collars 193 fixed on rock shaft 191 adjacent to the supporting frames 165 and 166 hold this shaft against axial displacement.

The front cross bar 190 of lever 188 has a pair of spaced lugs 194 which carry a pulley 195 on a pin 196. The lever 188 is connected to the wrapper tip 185 by means of two divergent arms 197. The lower ends of these arms are set in holes 198 in the cross bar 190 and secured by screws 199 (Fig. 11). The upper ends 197' of the arm 197 are pivotally connected to ears 200 on the wrapper tip 185 and these pivot ends act as trunnions on which the tip can turn. The ears 200 are shown as right-angled lugs secured to the ends of tip 185 by rivets 201. It will be apparent that the arms 197 constitute a rigid right-angled extension of lever 188.

It is clear from a study of Figs. 15 and 16 that as the lever 188 is swung upward through the required angle it pushes the front end of the wrapper 172 upward and closes the wrapper around the cylindrical flanges 176—177. This movement of the lever 188 is brought about by the following mechanical combination.

An arm 202 (Fig. 6) is pivoted at one end on a stud 203 projecting from the upright frame 166 and the free end of this arm is pivoted to the upper end of a link 204 by a pin 205. The lower end of link 204 has a slot 206 (Fig. 17) for receiving a pin 207 carried by a short lever 208 which is rigidly clamped to the rock shaft 191 by a screw 209 passing through a forked extension 210 of the lever. The pin 207 is always held at the top of slot 206 by a contractile spring 211 which is attached at one end to the link 204 (Fig. 6) and at the other end to a pin 211' on the lever 208 (Fig. 17). This arrangement allows the link 204 to swing as the pin 207 moves through an arc.

A strong coil spring 212 (Fig. 6) is attached at its upper end to the link 204 near the top end thereof and the other end of the spring is fastened to a fixed part of the machine, such as a lug 213. The spring 212 always tends to pull the link 204 down and this action of the spring is controlled or timed by the arm 202 which in turn is under the control of a motor driven cam assembly. The construction of this cam assembly will be described under the next heading.

When the wrapper 172 is open (Fig. 15) the operating connections for the wrapper are in the position illustrated in Fig. 6 where the arm 202 is held in its highest position. Let us assume that at a given moment the arm 202 is released for downward movement through a definite angle. Instantly the tension of spring 212 asserts itself and pulls the link 204 down, rocking the lever 208 and the shaft 191 through an arc calculated to swing the lever 188 into the wrapper closing position, as shown in Fig. 16.

When the closed wrapper is to be opened, the arm 202 is automatically lifted back and the link 204 is pulled up against the action of spring 212. This upward movement of link 204 causes the spring 211 to rock the shaft 191 clockwise whereby the lever 188 is swung down to the position shown in Fig. 15 to open the wrapper 172. An adjustable stop 214 limits the downward movement of the lever 188 and thereby determines the open position of the wrapper. As will appear later, the opening of wrapper 172 is one of a series of automatic operations that take place at the end of each scanning cycle.

Referring to Figs. 6 and 17, we utilize the timed movements of rock shaft 191 to control a switch 215 which is mounted on a bracket 216 carried by the upright frame 166. The switch 215 may be of any suitable type, such as a microswitch, so we need not show or describe any structural features of this well known device. It is enough to say that a button or lever 215' projects from the casing of the switch for operating the same. The projection 215' is always under spring pressure which tends to push it out. Because the switch 215 is instrumental in controlling the wrapper mechanism, we shall call it the wrapper switch.

The operation of switch 215 is controlled by a cam 217 (Fig. 17) fixed on the rock shaft 191. The periphery of this cam has a depression or recess 218 which extends over a definite arc. The cam 217 operates a follower 219 pivoted at 219' to the frame 166. The free end of the follower 219 extends between the switch 215 and the cam 217 and is provided with a rounded tooth 220 which rides over the cam periphery. As long as the tooth 220 engages the high edge of cam 217, the follower 219 keeps the switch button 215' pushed in to hold the switch open. When the rock shaft 191 and the cam 217 are rotated leftwise (as viewed in Fig. 17) by the spring 212 during the wrapper closing operation, the tooth 220 rides in the recess 218 and allows the switch button 215' to move outward and close the switch. What happens when the wrapper switch is closed will now be described.

In the final closing movement of the wrapper 172, it is necessary to give a separate adjustment to the tip 185 about the trunnions 197' (Fig. 16) in addition to the actuation of the tip by the lever 188. For this purpose, we attach a cord 221 to the tongue or extension 186 of the tip 185 and this cord is arranged as shown in Fig. 15.

From the extension 186 the cord 221 passes around the pulley 195 on lever 188, then rearward over a pulley 222 on a fixed upright plate 223, then down through the top of base 167 to a pulley 224, which is also mounted on plate 223. The cord now goes rearward around a pulley 225 on the plunger 226 of a solenoid 227 secured to the underside of the base. From here the cord 221 runs forward around a stud or roller 228 on a bracket 229, then upward through a hole in the base 167, then forward over the top of the base to a clamping screw 230. The end 221' of the cord is left free to serve as a finger grip for adjusting the cord before clamping it tight under the screw 230.

As shown in Fig. 2, the bracket 229 is an angular piece attached to the underside of base 167 by screws 231 and the vertical plate 223 is secured to the bracket as an extension thereof. The bracket 229 also carries a bar or narrow plate 232 which is attached by screws 233 to the bottom of the bracket. The plate 232 terminates in an upstanding lug 234 which is bifurcated to let the cord pass through. The lug 234 is in line with the pulley 225 on the solenoid plunger 226, whereby this lug forms a stop for the outward or return movement of the plunger. To make the solenoid stop 234 adjustable toward and from the plunger 226, the plate 232 is provided with longitudinal slots (not shown) for the screws 233. We usually provide the pulleys with suitable cord retainers to prevent the cord from jumping the pulleys. Such devices are well known and we need not show them.

Figure 13:
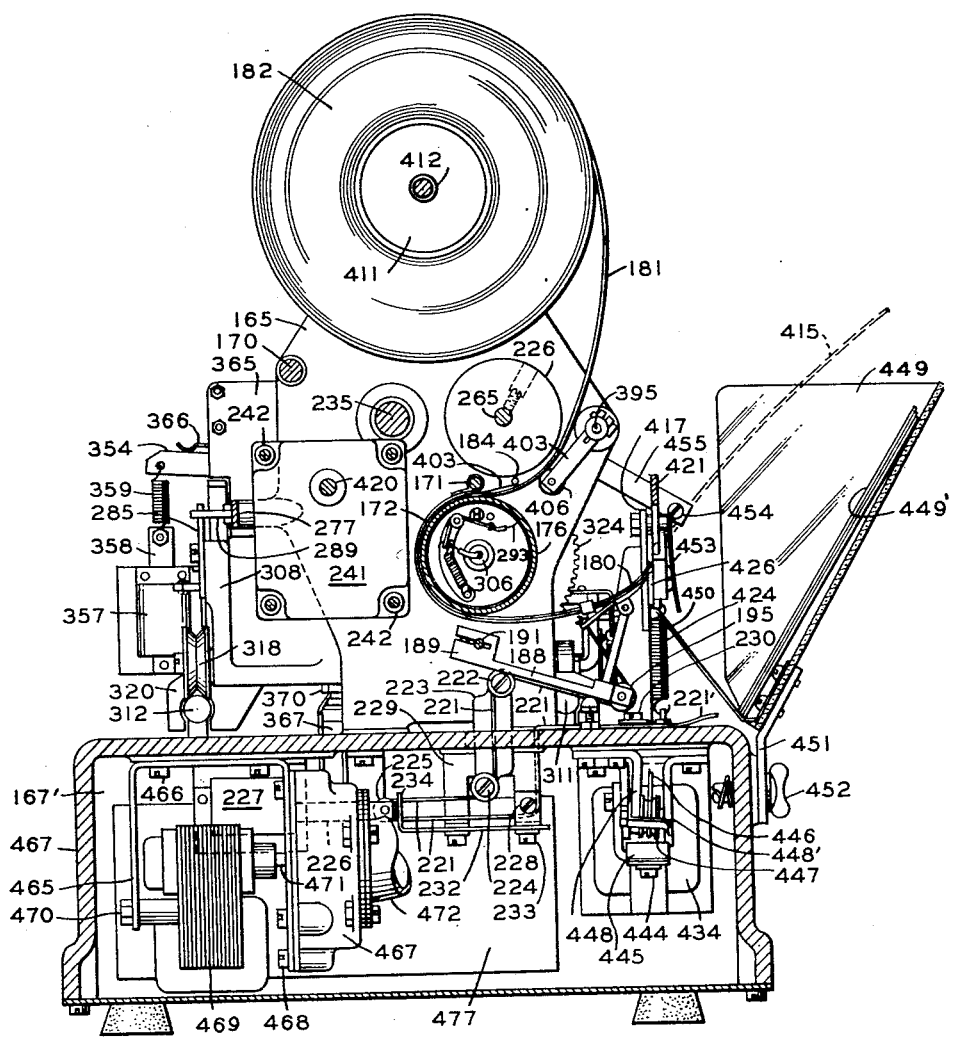
Fig. 13 is a view along section line 13—13 of Fig. 1 looking from left to right.

It is clear from Figs. 13 and 15 that when the solenoid 227 is energized and pulls in its plunger 226, the upper end of cord 221 is pulled down and the wrapper tip 185 is rocked about the trunnions 197' of arms 197. The solenoid 227 is energized when the switch 215 is closed, so that the two movements of the wrapper tip 185 by the lever 188 and by the cord 221 take place simultaneously upon operation of the rock shaft 191 as previously described.

As can be seen by comparing Figs. 15 and 16, the extension 186 on the wrapper tip 185 acts as a lever to rock the tip on the trunnions 197' when the cord is pulled down until the extension is in line with the taut cord upon the complete closing of the wrapper. We use the term "cord" for the element 221 in its broadest possible sense to include any flexible connection suitable for the purpose. We have found an ordinary fish line to be wholly satisfactory.

*The cam assembly and driving connections (Figs. 20–22)*

The power shaft of the machine is shown at 235 and is journaled in the two upright plates 165 and 166. The right-hand section of the power shaft (Fig. 1) is screw-threaded for the required length and constitutes a feed screw 236 for operating the carriage of the recording mechanism, as will be explained in due course. The left end of the shaft projects beyond the frame 166 and has a gear 237 fixed thereon by a set screw 238 or otherwise. The gear 237 is in permanent mesh with a pinion 239 on the shaft 240 of a motor 241 mounted between the plates 165—166. It is convenient to bolt the motor 241 to the left frame 166 by means of studs 242 (Fig. 2).

We have, then, as seen in Fig. 20, a permanent drive between the motor 241 and the power shaft 235, which keeps running as long as the motor is energized. However, there are other driving connections which are operated from the power shaft only at certain predetermined intervals controlled by a cam assembly CS loosely mounted as a unit on the shaft 235.

The control unit CS consists of three cams 243, 244 and 245, and a gear 246. These four parts are joined together face to face by screws 247 and always operate as one piece. A sleeve or bushing 248 extends through the cam assembly in a tight fit for mounting the same rotatably on the power shaft 235. The three cams 243, 244 and 245 are each of special configuration so as to carry out their intended functions. To distinguish these cams from each other we shall designate them as follows: The stop cam 243 which controls the starting and stopping of the unit CS; the paper feed cam 244 which controls the paper feed mechanism; and the wrapper cam 245 which controls the mechanism for the opening and closing of the wrapper 172.

In addition to what we have already said about the operation of the wrapper mechanism, we need only point out that the cam 245 actuates the arm or follower 202 which is always held against the cam by the operating spring 212 (Fig. 6). Looking at the bottom portion of Fig. 21 we see that the tooth 249 of the follower 202 is on the high edge 245a of cam 245, whereby the follower is held in its raised position and the wrapper 172 is open. When the tooth 249 encounters the low edge 245b of cam 245, the follower 202 is pulled down by the spring 212 and the wrapper is closed.

The stop cam 243 has its circular periphery 243a interrupted by two radial shoulders or stops 250 and 251 which are spaced circumferentially by a definite arc. The cam 243 has a follower 252 formed with a shoulder 253 arranged to interlock with the cam stops 250 and 251. The follower 252 is pivoted on the stud 203 by means of a slot 254 which allows the follower to be shifted lengthwise a small amount for a purpose we shall presently explain. It should be noted here that the stud 203 also supports the follower 202 of the wrapper cam 245. A spacing nut 255 on the stud 203 holds the followers 202 and 252 in proper alignment, as shown in Fig. 2.

It is clear from Figs. 21 and 22 that, when the follower 252 is locked to either one of the stops or shoulders 250 and 251, the cam assembly CS as a whole is held stationary on the rotating power shaft 235. Only when the follower 252 is disengaged from the stops 250 and 251 is the cam assembly released for operation by the power shaft through a friction clutch indicated as a whole by 256.

The clutch 256 may be of any practical construction and in the present instance it consists of a pair of felt disks 257 arranged in contact with the opposite sides of the cam assembly CS, a pressure disk 258 bearing against one of the felt disks, an adjusting nut 259 screwed on the outer end of the power shaft 235, and a spider spring 260 arranged between the elements 258 and 259. A nut 261 holds all the parts to the left of gear 237 locked on the power shaft. The pressure disk 258, which is slidable on the shaft 235, is connected to the nut 259 by pins 262 which slide in holes 263 in the nut. For easy manual adjustment the nut 259 is made as a large disk with a knurled edge. Adjustment of this nut varies the pressure of spring 260 against the disk 258 which transmits the pressure to the felt disks 257. In this way the cam assembly CS is frictionally mounted on the power shaft 235.

The gear 246 which forms part of the cam assembly CS is in permanent mesh with a pinion 264 fixed on the end of a shaft 265 which is journaled in the upright frames 165 and 166. The shaft 265 carries a roll or cylinder 266 which is a part of the paper feed mechanism to be described later.

It is clear from what we have said that the cam assembly CS is held locked on the power shaft 235 in either one of two angular positions as determined by the stop shoulders 250 and 251 on the cam 243. Therefore the control of the cam assembly for releasing or stopping the cam 243 depends essentially on the control of the cam follower 252. The mechanism for effectuating that control forms the subject of our next heading.

Control mechanism for the cam assembly CS

Figure 24:
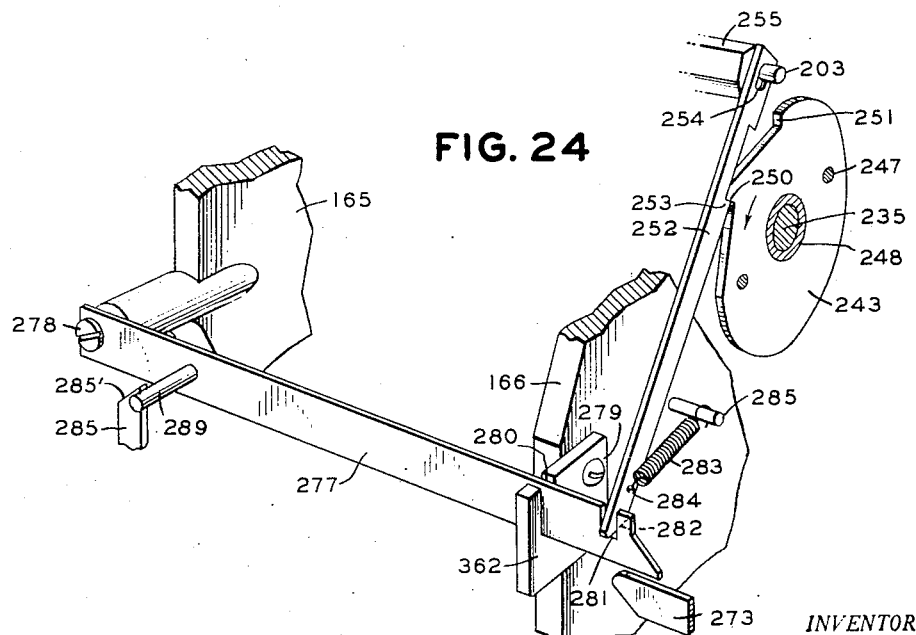
Fig. 24 shows certain connections operated by the cam assembly of Fig. 21.

In the description of this mechanism we can confine our attention to Figs. 2 and 24.

A solenoid 267 is mounted in vertical position on the base 167 of the machine by means of a suitable bracket 268. The mounting frame of the solenoid carries a bracket 269 which terminates on top in a lateral arm 270 for supporting the plunger 271 of the solenoid through an interposed coil spring 272. This spring always exerts an upward pull on the plunger and keeps it in normal raised position.

A latch 273 is pivoted on the bracket 269 by a stud 274. The outer end of latch 273 is slotted to receive a pin 275 on the plunger 271, whereby the vertical movements of the plunger rock the latch about its pivot. A stop 276 on bracket 269 holds the latch and the plunger in normal position against the action of spring 272. The inner end of latch 273 projects beneath the free end of a long horizontal lever 277 which is pivoted on a stud 278 carried by the frame 166. A plate 279 fixed on the frame 166 has a vertical slot 280 for receiving the outer end of lever 277 whereby the latter is guided in its movements. The lever 277, which we call the clutch release lever, normally rests on the bottom of the slot 280.

The function of lever 277 is to lift the follower 252 out of engagement with the stop shoulders 250 and 251 of the cam 243. For this purpose the lever 277 has a slot 281 near its free end for receiving the lower beveled end 282 of the cam follower 252. A spring 283 is attached at its front end to the lower end of the follower 252 at the point 284 and the rear end of the spring goes to a fixed stud 285 on the frame 166. The arrangement of spring 283 is such that it is higher at its rear end so that it always tends to rock the follower downward about the pivot 203 and at the same time slide it upward lengthwise as far as the pivot slot 254 will allow.

It will be seen that the contractile spring 283 always holds the cam follower 252 in contact with the operating lever 277 by pressing the beveled end 282 of the follower against the bottom of slot 281. When the solenoid 267 is energized, the descending plunger 271 rocks the free end of latch 273 upward against the lever 277 which is thereby thrown up and lifts the follower 252 out of engagement with the stop 250 on cam 243. The moment this stop cam is thus released, the cam assembly CS is driven by the power shaft 235 through the friction clutch 256.

It should be explained here that the solenoid 267 is energized only for a moment, so that the follower 252 is lifted off the cam 243 only for that brief interval. Since the action of restoring spring 283 is very quick and since the cam assembly rotates at a comparatively low speed, we have to guard against the possibility of the shoulder 253 of the returning follower 252 reenegaging the cam stop 250 before the latter has moved out of the way. We accomplish this by causing the spring 283 to slide the follower 252 upward at the very instant when it is lifted off the cam stop 250. This sliding movement, which is permitted by the slot 254, places the shoulder 253 of the returning follower behind the cam stop 250 so that the cam 243 is free to turn until the shoulder 253 encounters the next stop 251 (Fig. 22).

The release of the follower 252 from the shoulder 250 of cam 243 occurs upon the energizing of solenoid 267 at the beginning of a recording cycle to effect the closing of wrapper 172. When thus released the cam assembly CS turns from the position shown in Fig. 21 to that shown in Fig. 22 where the follower 252 again stops the cam assembly by engaging the other shouler 251. The cam assembly CS stays locked in the position shown in Fig. 22 during a recording operation.

To effect the automatic opening of the wrapper 172 after a recording operation, it is necessary to release the cam assembly for movement from the position shown in Fig. 22 back to its normal position in Fig. 21. This is accomplished by releasing the follower 252 from the cam shoulder 251 by mechanical connections independently of the solenoid 267.

The recording mechanism, which we shall describe under the next heading, is mounted on a slidable carriage K which moves slowly forward from right to left (Fig. 1) during a recording operation, or from left to right when looking at the rear of the machine as in Fig. 2. At its forward end the carriage K has an upstanding trigger 285 pivoted on a stud 286. A coil spring 287 attached to the bottom of the trigger normally holds the latter upright against a stop 288. The trigger 285 has a sloping top 285' which extends in front of a pin 289 on the clutch release lever 277.

When the trigger 285 encounters the pin 289 during the forward movement of carriage K, the lever 277 is not affected since the trigger simply rocks backward and passes under the pin. However, during the return movement of carriage K after a recording operation (from right to left in Fig. 2) the trigger 285 remains rigid and the sloping top 285' lifts the lever 277 with the result that the follower 252 is disengaged from the stop shoulder 251 of cam 243.

We should remember, then, that the clutch release lever 277 is operated at two different intervals by two different means. First, it is operated by the start solenoid 267 at the beginning of a recording cycle to release the follower 252 from the stop 250 of cam 243. This effects the closing of wrapper 172, as fully explained before. Second, the lever 277 is operated at the close of a recording cycle to release the follower 252 from the stop 251 of cam 243. This allows the cam assembly CS to rotate until the follower 252 again engages the cam stop 251. During this interval, not only is the wrapper 172 opened, as already mentioned, but other operations take place in automatic sequence, as will be explained in due course.

The recording mechanism

We have seen how the flexible wrapper 172 supports a recording blank in cylindrical form for recording on the inner unobstructed surface of the blank. This recording is done by an electric stylus which comprises an arm or holder 290 (Figs. 15 and 16) pivotally mounted on an insulating disk 291 by means of a stud 292. The stylus arm 290 is a right-angled strip of suitable spring metal, such as Phosphor bronze, which carries a short piece of steel wire 293 at its free end. The wire 293, which forms the recording point, is attached by pinching the end of the flat strip 290 around it to form a channel 290' (Fig. 19) in which the wire is seated, then filling the channel with solder 293'. For convenience we shall refer to the holder 290 and the wire tip 293 together as the stylus 290.

The stylus 290 is mounted in such a way on the stud 292 that it can be easily removed therefrom or mounted thereon, as when replacing a worn stylus with a new one. For this purpose we provide the stylus arm at the bend with a metal sleeve or bushing 294 which fits over the stud 292 so as to be easily slipped on and off. The bushing 294 can be attached to the stylus arm by solder since the two parts have considerable contact area.

One end of a light coil spring 295 is detachably hooked over the tail piece 296 of stylus 290 and the other end of this spring is fastened to a stud 297 on the supporting disk 291. When a new stylus is to be inserted, the operator simply pulls the old one off the stud 292, unhooks the spring 295, slips a new stylus in place, and hooks it up with the spring. It is the work of only a few moments. As seen in Fig. 14, the stylus 290 is spaced laterally from the disk 291 a sufficient distance to clear the adjacent cylindrical flange 176 when the parts are in normal position.

A conducting strip 298 is fastened at its ends to the studs 292 and 297 so as to lie flat against the disk 291. An insulated conductor 299 passing through the center of disk 291 is soldered to the strip 298, whereby the stylus 290 is permanently connected to this conductor. The insulated disk 291 carries a lever 300 which is pivoted on a pin 301 in a slotted block 302 mounted on the rear side of the disk by screws 303 (Fig. 18). The lever 300 projects through a hole 304 in the disk 291 and the front end of the lever engages the stylus arm 290 on top.

When the stylus arm 290 is in normal or stand-still position, as shown in Fig. 14 (that is, before the start of a recording operation) the rear end of lever 300 engages a stationary ring 305 which rocks the front of the lever downward. This forces the stylus 290 toward the center of disk 291 against the tension of spring 295, so that now the recording point 293 does not touch the paper. In other words, the lever 300 acts as a retractor for the stylus. When the disk 291 starts moving toward the left (as viewed in Fig. 14) the retractor 300 leaves the stop ring 305 and the stylus 290 is instantly rocked outwardly by the spring 295 into contact with the paper. The ring 305 can be attached to frame 165 by the same screws 178 that fasten the adjacent flange 176 in place, as shown in Fig. 12.

The insulating disk 291, which carries the stylus assembly and may therefore be called a stylus head, is fixed on the end of a shaft 306 by means of a collar 307 to which the disk is suitably secured, as shown in Fig. 14. In this case, the shaft 306 is hollow to receive the insulated conductor 299 which is connected to the stylus 290. The shaft 306, which will be called the stylus shaft, is mounted on the slidable carriage already identified as a whole by K. This carriage comprises a frame or casting with a long side plate 308 (Figs. 1, 2 and 4) and a pair of spaced transverse plates 309 and 310 in which the stylus shaft 306 is mounted, as can be seen in Figs. 1 and 2. The rear portion of plate 309 is considerably higher than the front portion (Fig. 1) to form an extension 309′ for a purpose that will presently appear.

The carriage K is slidably supported on a pair of rails 311 and 312, mounted on the base 167 of the machine in any practical way. In the present case, we use small blocks 313 to which the ends of the rails are secured by screws 314 extending upward through the base (Fig. 2). The plates 309 and 310 are connected at the bottom by a cross bar 315 (Figs. 1 and 4) which has a lateral extension 316 for supporting a roller 317 arranged to ride on the front rail 311. The side plate 308 of carriage K has a pair of ball-bearing wheels 318 which ride over the rear rail 312. The carriage K is thus supported for smooth rolling movement back and forth.

To prevent the carriage from leaving the rails we provide a retaining lug 319 for the front rail 311 and a pair of similar lugs 320 for the rear rail 312, as shown in Fig. 7. The retaining lugs 319 and 320 are apertured to receive the round rails in a loose fit which locks the carriage to the rails without interfering with the movements of the carriage. The lugs 319 and 320 are preferably cast integral with the carriage frame, as seen in Fig. 4. It goes without saying that the rails 311 and 312 are slid through the retaining lugs before the rails are fastened in place.

The stylus shaft 306 is driven by a synchronous motor 321 which is secured to the carriage plate 310 by screws 322. The shaft of motor 321 carries a pinion 323 which meshes with a large gear 324 on shaft 306. Referring to Fig. 5, the gear 324 is connected to the stylus shaft 306 through a friction clutch 325 which comprises a pair of felt rings 326 arranged in pressure contact with the opposite sides of the gear. The clutch rings 326 are held between a fixed collar 327 and a movable pressure disk 328. The collar 327 is clamped to shaft 306 by a set screw 329, and a second collar 330 is fixed on the shaft by a set screw 331. An expanding coil spring 332 is arranged between the disk 328 and the collar 330 whereby the felt rings 326 are pressed against the gear 324 with sufficient pressure to operate the stylus shaft 306. The clutch pressure can be regulated by the axial adjustment of collar 330.

Still referring to Fig. 5, the outer end of stylus shaft 306 carries an insulated slip ring 333 to which the end of conductor 299 is soldered. A brush 334 engages the slip ring 333 (Fig. 1) and this brush is mounted on an insulated block 335 secured to the carriage plate 310. The brush 334 is clamped to block 335 by a metal plate 336 to which a conductor 337 is soldered (Fig. 4). It will thus be seen that the electric stylus 290 is permanently connected to conductor 337 which is part of the recording circuit.

The phasing mechanism

A cam 338 is fixed on the stylus shaft 306 by a set screw 339 (Figs. 1B and 5) and this cam has a stop shoulder 340 which is normally in locking engagement with the armature 341 of an electromagnet 342. The free end of armature 341 carries a contact piece 341a which is insulated by a strip 341b (such as Bakelite) and engages the cam shoulder 340 when the magnet 342 is not energized. In other words, the insulated contact piece 341a is normally grounded through the cam 338. The magnet 342 has an L-shaped frame 343 which is set at the bottom in a recess 344 of an arm 345 projecting forwardly from the cross bar 315 of the carriage frame. A screw 346 secures the magnet 342 in place. The armature 341 is pivoted to the upper end of the magnet frame 343 by a pin 347.

Still referring to Fig. 1B, the armature 341 carries a right-angled bracket 348 with a depending arm 349 to which one end of a contracting coil spring 350 is attached. The other end of this spring is connected to a bracket 351 secured to the magnet frame 343. The tendency of spring 350 is to throw the armature up and this movement is limited by an adjustable stop 352 mounted on the bracket arm 349. The stop 352 is so adjusted that the contact piece 341a of the armature 341 engages the locking shoulder 340 on cam 338.

The function of cam 338 and magnet 342 is to hold the stylus shaft 306 against rotation until the moment when the magnet is energized to release the stylus 290 for operation by the synchronous motor 321. The instant in which the stylus is thus released for operation is called the phasing moment of the machine.

When the magnet 342 is deenergized, the spring 350 instantly rocks the armature 341 up against the rotating cam 338 which is stopped when the armature tip 341a strikes the shoulder 340. It should be noted that the cam 338 is always stopped in the same angular position. For distinction we shall designate the parts 338 and 342 as the phasing cam and the phasing magnet.

The carriage operating connections

During a recording operation, the stylus 290 not only rotates at a high speed but at the same time moves slowly forward axially inside the recording blank. This axial sliding movement is produced by connecting the carriage K with the motor driven feed screw 236, as we shall now describe.

Referring to Figs. 4 and 7, a lever 354 is pivoted on a stud 355 mounted on the rear extension 309′ of the carriage plate 309. The front end of lever 354 carries a half-nut 356 arranged to engage the feed screw 236 when the lever is rocked clockwise by the energizing of a solenoid 357. The plunger 358 of this solenoid is connected to the rear end of lever 354 through a strong contractile spring 359. The solenoid 357 is attached to the carriage plate 308 by screws 360 (Fig. 2).

A spring 361 coiled about the stud 355 has one end fixed in the plate extension 309′, and the other end of the spring bears on top of the lever 354 (Fig. 4), whereby the front end of this lever is normally held down to keep the half-nut 356 out of contact with the feed screw 236. The front part of lever 354 passes through a slotted plate or comb 362 attached to the front end of the plate extension 309' by screws 363. The comb 362 guides the lever 354 in its movements so that the half-nut 356 is held in correct relationship to the feed screw 236. The retractile movement of lever 354 is limited by the slot in comb 362.

The half-nut lever 354 controls a switch 364 (Figs. 2 and 7) mounted on an upright piece 365 which is secured to the rear extension 309' of the carriage plate 309. The switch 364 is the well known micro-switch type and has an operating arm 366 projecting out of the switch box. The free end of switch arm 366 presses against the rear end of lever 354. In the normal condition of this assembly, as shown in Fig. 7, the raised rear end of lever 354 holds the switch arm 366 in closed position. When the solenoid 357 is energized and rocks the lever 354 clockwise, the arm 366 automatically moves down to open the switch. The function of switch 364 is to keep the stylus 290 grounded until the carriage K is connected to the feed screw 236.

The carriage K is held in its start position by a spring drum 367 (Figs. 1 and 7) which is mounted in the base chamber 167' by means of a bracket 368. The spring drum 367 is a well known device which requires no description. We need only say that a flexible band or tape 369 which is connected to the spiral spring in the drum is attached to a stud 370 on the bottom of the carriage K. As the carriage moves forward (to the left in Fig. 1) during a scanning operation, the spring drum is wound up. When the carriage is released upon the deenergization of the half-nut solenoid 357, the tension of the spring drum instantly retracts the carriage.

The stylus carriage K is held in a definite start position by a novel stop device comprising (see Fig. 7) a bar 371 slidably mounted in a plate 372 which is secured to the carriage plate 310 by screws 373. The plate 372 has a recess 372' in which the stop bar 371 is housed. The bar 371 has a stud 374 which projects through a slot 375 in plate 372. A contactile spring 376 is attached at its upper end to the stud 374 and at its lower end to a stud 377 on plate 372, so that the bar 371 is held down with its stud 374 resting on the bottom of slot 375. The stop bar 371 is formed on top with a lateral flange 378 which acts as a finger piece for lifting the bar when required.

As seen in Figs. 1 and 2, the lower end of bar 371 bears against a bumper 379 carried by an angle bracket 380 which is secured to the base of the machine by screws 381. The bumper 379 is of suitable shock and noise absorbing material such as rubber. The screws 381 pass through slots 380' in bracket 380 (Fig. 4) whereby the bracket is adjustable lengthwise of the carriage to regulate its start position with great accuracy.

The normal or start position of carriage K controls a switch 382 (Fig. 1) which projects through a slot in base 167 and is mounted on a bracket 383 secured to the underside of the base. The switch 382 has an operating arm 384 which carries a roller 385 at its free end and this roller engages the rear edge of the carriage when the latter is in start position. This arrangement normally holds the arm 384 depressed and the switch 382 is open. The moment the carriage starts moving forward it allows the arm 384 to spring up and the switch 382 is closed. The function of switch 382 is to control the phasing magnet 342.

When the carriage K reaches its final position at the end of a recording operation, as indicated by the dotted position 356' of the half-nut 356 in Figs. 1 and 4, it automatically closes a switch 386 (Figs. 2 and 4) mounted on the lower frame 166 at the bottom by a bracket 387. The switch 386 has a spring arm 388 arranged to project laterally into the path of the front edge of carriage plate 308 (Fig. 4).

Normally the switch 386 is open. As the carriage K reaches the end of its scanning movement it thrusts the switch arm 388 to closing position. The closing of switch 386 releases the solenoid 357, so that the half nut 356 is withdrawn from the feed screw 236 and the carriage K is instantly pulled back to start position by the spring drum 367. The switch 386 may properly be called the end-of-message switch.

We mentioned in our description of the mounting of stylus 290 on the head 291 that the stylus was easily removable from the supporting stud 292 (Figs. 15 and 16) so that a worn stylus could be quickly removed and a new one substituted. For this stylus replacement, it is necessary to have the carriage K remain in its forward or operated position so that the stylus will be accessible to the operator.

For this purpose, we use the carriage stop 371. When the operator wants to change a stylus, he simply moves the carriage forward by hand (to the left in Fig. 1) until the lower end of stop 371 rides over a beveled block 389 fixed on the base 167 at a proper distance from the normal position of the stop. The block 389 has a slot 390 into which the spring pressed bar 371 snaps automatically and thereby holds the carriage in forward position. In this position of the carriage the stylus 290 is closely adjacent to the open flange 177 (Fig. 14) and is easily reached by the fingers after the flange is uncovered, as will be explained later. To release the carriage the operator simply lifts the stop 371 out of the block 389 by the finger-piece 378, whereupon the spring drum 367 returns the carriage to start position. It is to be understood that the block 389 does not interfere with the scanning movements of the carriage K because the carriage completes its forward travel before the stop 371 reaches the block 389. The operating arm 388 of switch 386 is sufficiently flexible to permit the small extra movement required to bring the carriage stop 371 into locking engagement with the block 389.

*The paper feed mechanism*

After a transmitted message has been recorded, the wrapper 172 is automatically opened and a fresh length of paper is fed into the wrapper from the supply roll 182, while the recorded section of the paper is at the same time projected out of the wrapper for removal. We shall now describe the mechanism that feeds the paper into the open wrapper 172 and for this description we shall refer particularly to Fig. 23.

We have already seen from Fig. 20 that a roll or cylinder 266 is operated from the power shaft 235 through the gear 246 of the cam assembly CS which is frictionally mounted on the power shaft. The cam 244 of the cam assembly has a high edge 391 and a low edge 392 (Figs. 21 and 23), each covering a prescribed arc. A follower 393 pivoted on a stud 394 rides over the periphery of cam 244. The stud 394 is carried by the left frame 166 as shown in Fig. 6.

Figure 23:
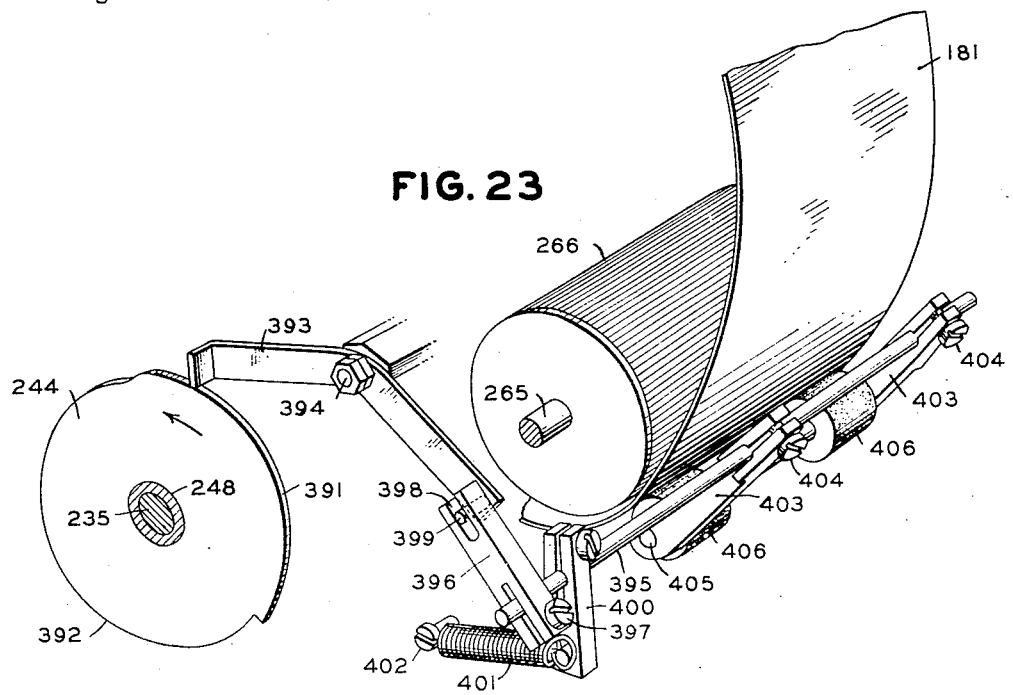
Fig. 23 shows details of the paper feed mechanism.

Referring to Fig. 23, there is a rotary shaft 395 which has an arm 396 rigidly clamped thereon by a set screw 397. The free end of arm 396 has a slot 398 adapted to receive a pin 399 projecting laterally from the forward end of the cam follower 393. The shaft 395 is mounted in the upright frames 165 and 166 (Fig. 1) in parallel relation to the roll 266 and adjacent thereto. A second arm 400 fixed on the shaft 395 is connected at its free end to a contractile spring 401 which is fastened at its free end to a stud 402 on frame 166 (Fig. 6). The spring 401 always tends to rock the shaft 395 clockwise and to press the free end of the follower 393 against the cam 244.

The shaft 395 carries two arms 403 which extend downward and rearward toward the feed roll 266. The arms 403 are secured to shaft 395 in correct angular position by set screws 404. A rod 405 is journaled in the lower ends of arms 403 and carries a pair of rolls 406 made of soft rubber. A simple way to fit these rolls on the rod 405 so as to rotate therewith is to knurl the end portions of the rod and force the rollers over the knurls.

The tendency of spring 401 is to urge the rollers 406 against the feed roll 266 but the rollers are held away from the feed roll as long as the follower 393 engages the high edge 391 of cam 244. The continuous paper strip 181 passes from the supply roll 182 through the space between the feed roll 266 and the rubber rollers 406. When the follower 393 rides over the lower edge 392 of cam 244, the spring 401 instantly moves the rollers 406 against the feed roll 266 and carries the paper strip 181 into pressure contact therewith. Therefore, the rotation of roll 266 by the motor 241 feeds the next recording blank into the open wrapper 172. To improve the feeding action of roll 266 it may be striated lengthwise very finely.

The movements of cam 244 are so timed that the paper feeding operation takes place automatically upon the opening of the wrapper 172 at the end of a recording cycle. The diameter of feed roll 266 and the circumferential length of the operative edge 392 of cam 244 are so calculated that a measured length of paper is fed into the wrapper at each paper feed operation. This measured length of recording paper represents the width (that is, the distance from side to side) of the recorded telegram sheet, while the length of the sheet (the up and down distance) is determined by the width of the supply roll 182.

The automatic feeding of the paper into the wrapper 172 requires automatic means for notifying the operator when the supply of paper is nearing exhaustion. Referring to Figs. 2, 4 and 12, a switch 407 is mounted on a bracket 408 adjustably attached to the right frame 165 by screws 408'. The switch 407 has a spring arm 409 which carries a roller 410 arranged to engage the adjacent side of the supply roll 182. The roller 410 presses against the paper roll 182 near its core 411 (Fig. 12), which is a wooden cylinder carrying a pair of trunnions 412 supported in open slots 413 on top of the transverse frames 165 and 166.

As long as there is sufficient paper in the supply roll 182 to form a bearing surface for the spring pressed roller 410, the switch 407 remains open. When the paper turns are exhausted beyond the follower 410 and no longer hold it back, it suddenly snaps forward and closes the switch 407. Any suitable alarm device may be controlled by the switch 407, such as a bell or a lamp or even both. In our machine, the switch 407 lights the red lamp 414 mounted on a bracket 414' which is attached to the left frame 166 (Figs. 4 and 6).

We should point out that the switch arm 409 engages the side of supply roll 182 and therefore operates with a snap action when the diameter of the roll reaches a predetermined minimum. This distinguishes our alarm device from prior structures of this type where a lever engages the face of the supply roll and moves slowly as the diameter of the roll diminishes, so that no snap action of the control member is possible.

*The paper cutting mechanism*

Every time the paper feed advances a measured length of paper into the open wrapper 172 upon completion of a recording operation, the section of paper that bears the recorded message is projected out of the wrapper, as indicated by the dotted outline 415 in Fig. 13. Before the wrapper can close again, it is necessary to cut off the recorded message. This is automatically accomplished by the following mechanism for which we shall refer to Figs. 1, 4, 6, 8, 9 and 15.

A block 416 on base 167 carries a plate 417 which is set into a recess in the block and is secured by screws 418 (Figs. 1 and 4). The plate 417 has an extension 419 which is thicker than the plate itself and carries a stud 420 in the form of an adjustable shoulder screw for pivotally supporting a knife blade 421. This blade is attached to a holder 422 by rivets 423 and the holder is mounted on the pivot stud 420. As shown in Fig. 1, a retractile spring 424 secured at one end to the base 167 is attached to the rear end of the blade holder 422 and normally holds the blade 421 up against a stop 425 carried by an extension 417' of plate 417.

A stationary knife blade 426 in set in a recess in plate 417 and secured by rivets 427. The left end of this fixed blade is fastened to a block 428 by a screw 429. The block 428, which is mounted on the base 167 in any practical way or cast integral therewith, supports a leaf spring 430 for guiding the movable knife blade 421. An extension 431 attached to the free end of the blade 421 passes between the stationary blade 426 and the spring 430, which thus presses against the movable blade and holds it in line. The tension between the two knife blades is regulated by a bowed spring 432 on the pivot stud 420 (Fig. 4). A part 432' of spring 432 projects into a slot 433 (Fig. 1) on the end of extension 419 of plate 417 to hold the spring against turning.

When the recorded paper 415 is projected out of the wrapper 172, it passes between the open knife blades 421 and 426 as shown in Fig. 13. When the movable blade 421 is swung down, the paper is cut off along the edge of the wrapper as closely as possible. The cutting operation of blade 421 is done electrically at a predetermined moment through the following connections.

Referring to Figs. 1, 1A and 13, there is a solenoid 434 in the base chamber 167' depending from the top of the base to which it is secured by screws 435. The solenoid 434 has a plunger 436 which operates with a long longitudinal stroke and therefore requires special supporting and guiding means. The plunger moves between a pair of guide plates 437 and 438 which are secured to the top of the base casting by screws 439. The bottom of the plunger rests on a plate 440 which is an L-shaped piece attached to the side plate 438 by screws 441. To permit vertical adjustment of the bottom plate 440, it is provided with vertical slots 442 through which the screws 441 extend.

A plate 443 is secured to the bottom guide 440 by screws 444 and the forward end of this plate terminates in an upstanding flange 445 which forms a stop for the outward movement of plunger 436. The stop 445 is adjustable lengthwise of the plunger by providing a longitudinal slot (not shown) through which the fastening screws 444 pass. A cord 446 is tied at one end to the plunger 436 and at the other end to the free end of the movable knife 421. The cord 446 passes through the top of base 167 around a pulley 447 carried by a bracket 448 which is attached to the underside of the base. A guide 448' on the bracket 448 extends across the pulley 447 to hold the cord in place. The retractile spring 424 normally holds the plunger 436 against the stop 445, which can be adjusted to make the cord 446 taut.

When the cutter magnet 434 (as we shall call it) is energized, the plunger 436 is drawn in and the knife blade 421 is quickly pulled down to cut off the recorded sheet 415 which has been projected out of the wrapper 172. The discharged telegrams drop into a delivery chute 449 at the front of the machine (Figs. 6 and 13). The delivery chute 449 is preferably a transparent receptacle through which the operator can see the discharged telegrams 449'. The bottom of chute 449 is formed by an inclined plate 450 which guides the discharged sheets towards the front wall of the chute.

In the present machine, the delivery chute 449 is detachably secured to the base 167 by means of a bracket 451 which is fastened in place by a manually operable lock 452 of any practical construction. To protect the operator from accidentally cutting his hand on the knife blade 421, as when he removes the telegrams from the delivery chute, we provide a guard 453 which is a light blade of sheet metal pivotally suspended on a rod 454 in front of the knife. The rod 454 is carried by an arm 455 secured to the frame 165. The swinging guard plate 453 is pushed aside by the paper as it emerges from the wrapper (Fig. 13).

The cutter magnet 434 is energized at the proper moment by the operation of a switch 456 (Fig. 12) mounted on frame 165 and associated with the paper feed shaft 265. The right end of this shaft extends through the frame 165 and carries a pinion 457 which permanently engages a gear 458 mounted on a stud 459 on frame 165. A cam 460 is mounted on the stud 459 and connected to gear 458 so that those two parts always rotate together. The cam 460 has a notch 461 adapted to receive the end of a follower 462 which is pivoted on a stud 463 on frame 165.

The switch 456 has a spring pressed button 464 which bears down on the follower 462. As long as the follower rides over the high edge of cam 460, it holds the switch button back and the switch remains open. When the follower 462 drops into the notch 461, the button 464 moves out and the switch 456 is closed. As will be explained later, the closing of switch 456 energizes the cutter magnet 434.

The gear ratio between the elements 457 and 458 is so related to the movement of the paper feed shaft 265 that during each paper feed operation the cam 460 makes one revolution from the position shown in Fig. 12. This means that when the required length of fresh paper has been fed into the open wrapper 172 and the recorded sheet projected out of the wrapper, the cutter magnet 434 is energized for a moment (only while the follower 462 is in the notch of cam 460) and quickly pulls the knife down to cut off the telegram sheet 415. The shaft 265 continues to move after the cutting operation sufficiently to cam the follower 462 out of the notch 461. This opens the switch 456 to release the magnet 434, whereupon the knife 421 flies up to normal position. It will thus be seen that the cam 244 (Fig. 23) controls the paper feed operation mechanically and controls the paper cutting operation electrically.

*The smoke remover*

In facsimile recorders using an electric stylus on specially prepared paper the high voltage of the recording operation liberates fumes or smoke which it is desirable to remove and render innocuous. For this purpose we have devised a blower arrangement which draws the smoke from the recording chamber into a filter box mounted in the base chamber of the machine.

Referring to Fig. 13, an inverted U-shaped bracket 465 is attached by screws 466 to the underside of base 167. To the right side of bracket 465 is fastened a fan casing 467 by screws 468 and the other side of the bracket carries a motor 469 which is secured by screws 470. The motor shaft 471 extends into the fan casing 467 where it operates a suitable fan or blower (not shown).

The intake of the blower casing 467 connects with a metal pipe 472 which extends upward through a hole in the base top. The upper end of pipe 472 connects with a short piece of rubber tubing 472' which is connected at its upper end to a metal elbow pipe 473. This pipe is attached at its upper end to the flange 177 of the wrapper assembly (Fig. 14) by means of a metal fitting 474 which has a circular flange 475 adapted to fit into the flange 177 in a tight yet readily separable connection. The elbow flange 475 is slotted to make it slightly flexible and thereby produce an air tight joint with the flange 177. When the operator wants to change the stylus, as previously explained, he pulls out the elbow 473 which is freely movable out of and into closing position because of its mounting on the flexible rubber tube 472'.

The outlet of the blower casing 467 is connected by a tube 476 to a filter box 477 secured to the top of the base by brackets 478 and 479 (Figs. 1 and 12). The box 477 contains suitable material which filters out the smoke and allows the purified air to escape through perforations in the cover (not shown). It will thus be clear that the blower motor 469 withdraws the smoke liberated in the recording chamber 179 and blows it into the filter box 477. The blower motor 469 is energized simultaneously with the power motor 241.

We claim as our invention:

1. A facsimile recording machine having a flexible wrapper supported at one end, a fixed curved rigid tip secured to the other end of said flexible wrapper, said wrapper when open being adapted to receive a recording blank, cylindrical flanges cooperating with said wrapper to support a blank in cylindrical form when the wrapper is closed, the curvature of said rigid tip corresponding to the curvature of the cylindrical flange and mechanism connected to said tip for closing the wrapper into a cylindrical form and opening said wrapper, and other means connected to the rigid tip for rocking said tip relatively to the wrapper so as to bring the tip against said flanges during the final closing movement of the wrapper.

2. A facsimile recording machine having a flexible wrapper for holding a length of paper in cylindrical form for recording, cam means for opening and closing said wrapper, locking means to selectively control said cam means, a device for feeding a measured length of paper from a continuous supply roll into the open wrapper, means including a scanning carriage for recording on the inner surface of the supported blank when the wrapper is closed, means controlled by said carriage for releasing said locking means to permit rotation of the cam means thereby opening the wrapper at the end of message transmission, means for operating said paper feed device upon opening of the wrapper to project the recorded sheet out of the wrapper and feed a fresh blank into the wrapper, a cutting member automatically actuated after said paper feed operation to cut off the recorded sheet, means for so controlling said wrapper-opening connections that the wrapper is held open after said cutting operation and means independent of all of said foregoing means for controlling said connections to close the wrapper.

3. A facsimile recorder having a flexible wrapper normally open to receive a recording blank, a paper supply roll, a device for feeding a definite length of recording paper from said supply roll into the open wrapper, cam means for closing and opening said wrapper, means cooperating with said wrapper when closed to support said length of paper in cylindrical form, scanning apparatus including a carriage for internal scanning of a blank in the wrapper, a power shaft for said apparatus, a cam assembly frictionally mounted on said shaft and normally locked against rotation, solenoid actuated means for releasing said cam assembly at the beginning of a recording cycle, separate means actuated by said carriage for releasing said cam assembly at the end of a recording cycle, connections whereby the release of said cam assembly at the beginning of a recording cycle operates said mechanism to close the wrapper, connections whereby the release of said cam assembly at the end of a recording cycle opens the wrapper and operates said paper feed device, and a shearing member automatically actuated after the paper feed operation for cutting off the recorded section of the paper.

References Cited in the file of this patent

UNITED STATES PATENTS

| Number | Name | Date |
|---|---|---|
| 848,978 | Donoghue | Apr. 2, 1907 |
| 1,105,906 | Hess | Aug. 4, 1914 |
| 1,913,304 | Brackett et al. | June 6, 1933 |
| 2,153,917 | Exline | Apr. 11, 1939 |
| 2,172,539 | Kimmich | Sept. 12, 1939 |
| 2,189,059 | Dearsley | Feb. 6, 1940 |
| 2,328,435 | Eickmeyer et al. | Aug. 31, 1943 |
| 2,446,400 | Woolley | Aug. 3, 1948 |
| 2,483,427 | Nicholson et al. | Oct. 4, 1949 |
| 2,511,892 | Wise | June 20, 1950 |
| 2,520,918 | Elarde | Sept. 5, 1950 |